US011381738B2

(12) United States Patent
Li et al.

(10) Patent No.: US 11,381,738 B2
(45) Date of Patent: Jul. 5, 2022

(54) METHOD FOR A MOBILE DEVICE TO PHOTOGRAPH A PANORAMIC IMAGE, MOBILE DEVICE, AND COMPUTER READABLE STORAGE MEDIUM AND COMPUTER PRODUCT (71) Applicant: BOE TECHNOLOGY GROUP CO., LTD., Beijing (CN)

(72) Inventors: Weiguo Li, Beijing (CN); Tianyue Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 623 days.

(21) Appl. No.: 16/335,991

(22) PCT Filed: Jun. 15, 2018

(86) PCT No.: PCT/CN2018/091385
§ 371 (c)(1),
(2) Date: Mar. 22, 2019

(87) PCT Pub. No.: WO2019/062214
PCT Pub. Date: Apr. 4, 2019

(65) Prior Publication Data
US 2021/0368097 A1 Nov. 25, 2021

(30) Foreign Application Priority Data
Sep. 30, 2017 (CN) .......................... 201710938414.2

(51) Int. Cl.
H04N 5/232 (2006.01)
G06T 7/13 (2017.01)

(52) U.S. Cl.
CPC ........... H04N 5/23238 (2013.01); G06T 7/13 (2017.01); H04N 5/23232 (2013.01)

(58) Field of Classification Search
None
See application file for complete search history.

(56) References Cited

U.S. PATENT DOCUMENTS 6,930,703 B1    8/2005  Hubel et al.
7,424,218 B2    9/2008  Baudisch et al.
(Continued)

FOREIGN PATENT DOCUMENTS

CN    101228477 A    7/2008
CN    101970240 A    2/2011
(Continued)

OTHER PUBLICATIONS

International Search Report of PCT/CN2018/091385 in Chinese, dated Jul. 20, 2018, with English translation.
(Continued)

Primary Examiner — Eileen M Adams
(74) Attorney, Agent, or Firm — Collard & Roe, P.C.

(57) ABSTRACT

A method for a mobile device to photograph a panoramic image includes: photographing, by a camera in the mobile device, a first image at a first time, and sensing, by a sensor in the mobile device, a first directing vector when the camera photographs the first image; sensing, by the sensor, an actually measured directing vector of the camera at a second time; photographing, by the camera, a second image, and sensing, by the sensor, a second directing vector when the camera photographs the second image, in case that a first trigger photographing threshold or a second trigger photographing threshold is reached; determining whether a photographing stop condition is satisfied, in case that the photographing stop condition is satisfied, generating a panoramic image based on the images photographed by the camera.

13 Claims, 3 Drawing Sheets (56) References Cited

U.S. PATENT DOCUMENTS

| | | |
|---|---|---|
| 2004/0189849 A1 | 9/2004 | Hofer |
| 2009/0153685 A1 | 6/2009 | Son et al. |
| 2010/0309273 A1 | 12/2010 | Salvestro |
| 2012/0293607 A1 | 11/2012 | Bhogal et al. |
| 2012/0293609 A1 | 11/2012 | Doepke et al. |
| 2013/0076856 A1* | 3/2013 | Wakabayashi ....... H04N 13/239 348/36 |
| 2014/0139621 A1 | 5/2014 | Shinozaki et al. |
| 2016/0219223 A1* | 7/2016 | Eline ...................... B64C 27/08 |
| 2018/0139431 A1* | 5/2018 | Simek .................. H04N 5/2258 |
| 2018/0338126 A1* | 11/2018 | Trevor ................... G01B 21/22 |

FOREIGN PATENT DOCUMENTS

| | | |
|---|---|---|
| CN | 102905079 A | 1/2013 |
| CN | 103176347 A | 6/2013 |
| CN | 103534727 A | 1/2014 |
| CN | 103813089 A | 5/2014 |
| CN | 104320581 A | 1/2015 |
| CN | 107105166 A | 8/2017 |
| EP | 1 530 360 A2 | 5/2005 |
| WO | 2007/122584 A1 | 11/2007 |

OTHER PUBLICATIONS

Notice of Transmittal of the International Search Report of PCT/CN2018/091385 in Chinese, dated Jul. 20, 2018.

Written Opinion of the International Searching Authority of PCT/CN2018/091385 in Chinese, dated Jul. 20, 2018 with English translation.

Extended European Search Report in European Patent Application No. 18859941.9 dated Mar. 26, 2021.

Baudisch, et al., Panoramic Viewfinder: Providing a Real-Time Preview to Help Users Avoid Flaws in Panoramic Pictures, Nov. 23-25, 2005; pp. 1-10, Proceedings of OZCHI 2005, Canberra, Autralia.

Chinese Office Action in Chinese Application No. 201710938414.2, dated Aug. 5, 2020 with English translation.

* cited by examiner

METHOD FOR A MOBILE DEVICE TO PHOTOGRAPH A PANORAMIC IMAGE, MOBILE DEVICE, AND COMPUTER READABLE STORAGE MEDIUM AND COMPUTER PRODUCT

CROSS-REFERENCE TO RELATED APPLICATION

This application is the National Stage of PCT/CN2018/091385 filed on Jun. 15, 2018, which claims priority under 35 U.S.C. § 119 of Chinese Application No. 201710938414.2 filed on Sep. 30, 2017, the disclosure of which is incorporated by reference.

TECHNICAL FIELD

The present disclosure relates to a field of image photographing, in particular to a method for a mobile device to photograph a panoramic image, a mobile device, a computer readable storage medium and a computer product.

BACKGROUND

At present, an intelligent mobile device can support various photographing modes, wherein a panorama photographing mode requires that a user is fixed relatively at a photographing point, rotates the direction of lenses along a same space direction (generally, it is a horizontal direction or a vertical direction), takes photographs continuously and obtain a final picture. When a mobile device photographs a panoramic image, it is commonly set as photographing a plurality of images continuously at regular time intervals, but the moving speed of hands of human beings cannot maintain constant when adjusting a camera, thereby causing poor quality of a photographed image.

SUMMARY

According to a first aspect of the present disclosure, there is provided a method for a mobile device to photograph a panoramic image, the mobile device comprises a sensor and a camera, the method comprises: photographing, by the camera, a first image at a first time, and sensing, by the sensor, a first directing vector when the camera photographs the first image; sensing, by the sensor, an actually measured directing vector of the camera at a second time; photographing, by the camera, a second image, and sensing, by the sensor, a second directing vector when the camera photographs the second image, in case that a variation of the actually measured directing vector relative to the first directing vector is greater than or equal to a first trigger photographing threshold or a time interval between the second time and the first time is greater than or equal to a second trigger photographing threshold; generating a panoramic image based on a plurality of photographed images when it is determined that a photographing stop condition is satisfied.

In one embodiment, the method can further comprise: marking the first directing vector as a direction vector of the first image, and marking the second directing vector as a direction vector of the second image.

In one embodiment, the mobile device can further comprise a display screen; the method can further comprise: displaying currently photographed respective images within the display screen, in case that the photographing stop condition is not satisfied.

In one embodiment, the method can further comprise: determining a pixel shift of the second image relative to the first image; and determining a relative position of the first image and the second image according to the pixel shift of the second image relative to the first image.

In one embodiment, said determining a pixel shift of the second image relative to the first image can further comprise: determining an image overlapping area of the first image and the second image; and determining the pixel shift of the second image relative to the first image according to the image overlapping area.

In one embodiment, said determining a pixel shift of the second image relative to the first image can further comprise: obtaining a reference ratio of the pixel shift and a variation of a direction vector; and determining the pixel shift of the second image relative to the first image according to the reference ratio and a variation of the direction vector of the second image relative to the direction vector of the first image.

In one embodiment, the reference ratio is obtained based on the pixel shift and the variation of the direction vector between a first image initially photographed by the camera and a second image initially photographed by the camera.

In one embodiment, the method can further comprise: determining an edge area of the image overlapping area of the first image and the second image; and correcting a relative position of the first image and the second image according to the edge area.

In one embodiment, said generating a panoramic image can further comprise: splicing the plurality of images according to relative positions among the plurality of images; and selecting an image within a maximum valid rectangular area as a panoramic image.

According to a second aspect of the present disclosure, there is provided a mobile device, comprising: a camera, configured to photograph a first image at a first time; a sensor, configured to sense a first directing vector when the camera photographs the first image, and sense an actually measured directing vector of the camera at a second time; a processor, configured to control the camera to photograph the second image and control the sensor to sense a second directing vector when the camera photographs the second image, in case that a variation of the actually measured directing vector relative to the first directing vector is greater than or equal to a first trigger photographing threshold or a time interval between the second time and the first time is greater than or equal to a second trigger photographing threshold, and generate a panoramic image based on a plurality of photographed images, when it is determined that a photographing stop condition is satisfied.

In one embodiment, the processor can be further configured to mark the first directing vector as a direction vector of the first image, and mark the second directing vector as a direction vector of the second image.

In one embodiment, the mobile device can further comprise: a display screen, configured to display currently photographed respective images within the display screen, in case that the photographing stop condition is not satisfied.

In one embodiment, the processor can be further configured to: determine a pixel shift of the second image relative to the first image; and determine a relative position of the first image and the second image according to the pixel shift of the second image relative to the first image.

In one embodiment, the processor can be further configured to: determine an image overlapping area of the first image and the second image; and determine the pixel shift of the second image relative to the first image according to the image overlapping area.

In one embodiment, the processor can be further configured to: obtain a reference ratio of the pixel shift and a variation of a direction vector; and determine the pixel shift of the second image relative to the first image according to the reference ratio and a variation of the direction vector of the second image relative to the direction vector of the first image.

In one embodiment, the reference ratio is obtained based on the pixel shift and the variation of the direction vector between a first image initially photographed by the camera and a second image initially photographed by the camera.

In one embodiment, the processor can be further configured to: determine an edge area of the image overlapping area of the first image and the second image; and correct a relative position of the first image and the second image according to the edge area.

In one embodiment, the processor is further configured to: splice the plurality of images according to relative positions among the plurality of images; and select an image within a maximum valid rectangular area as a panoramic image.

According to a third aspect of the present disclosure, there is provided a mobile device used to perform the method according to the first aspect of the present disclosure, comprising: an image capturing unit, a sensing unit, a controlling unit, and a position determining unit.

According to a fourth aspect of the present disclosure, there is provided a computer readable storage medium used to store a computer program comprising instructions used to perform one or more steps in the method according to the first aspect of the present disclosure.

According to a fifth aspect, there is provided a computer product, comprising one or more processors, the processor being configured to execute computer instructions, to perform one or more steps in the method according to the first aspect of the present disclosure.

BRIEF DESCRIPTION OF THE DRAWINGS

In order to describe technical solutions of embodiments of the present disclosure more clearly, accompanying figures of the embodiments will be introduced simply. Obviously, the accompanying figures described below only relate to some embodiments of the present disclosure, but not limitation to the present disclosure.

DETAILED DESCRIPTION

Respective embodiments according to the present disclosure will be described in detail by referring to the accompanying figures. Herein, it needs to note that in the accompanying figures, same reference marks are basically given to component parts having same or similar structures and functions, and repeated descriptions relating thereto will be omitted.

In order to make purposes, technical solutions and advantages of embodiments of the present disclosure more clear, technical solutions of the embodiments of the present disclosure will be described clearly and completely by combining with the accompanying figures of the embodiments of the present disclosure. Obviously, the embodiments described below are a part of embodiments of the present disclosure, but not all the embodiments. Based on the embodiments of the present disclosure described below, all the other embodiments obtained by those skilled in the art without any inventive labor belong to the scope sought for protection in the present disclosure.

Unless otherwise defined, technical terms or scientific terms used herein shall have common meanings understood by those ordinary skilled in the art. "First", "second" and similar words used in the present disclosure do not indicate any sequence, quantity or importance, but are just used to distinguish different component parts. Also, "comprise" or "include" or other similar words means that an element or object prior to this word covers an element or object or its equivalents subsequent to the word, but does not exclude other elements or objects. "Connect" or "connect to" or other similar words are not limited to physical or mechanical connection, but can comprise electrical connection, regardless of direct connection or indirect connection. "Up", "down", "left", and "right" are only used to indicate relative position relationship. After an absolute position of a described object is changed, its relative position relationship is likely to be changed correspondingly.

Figure 1:
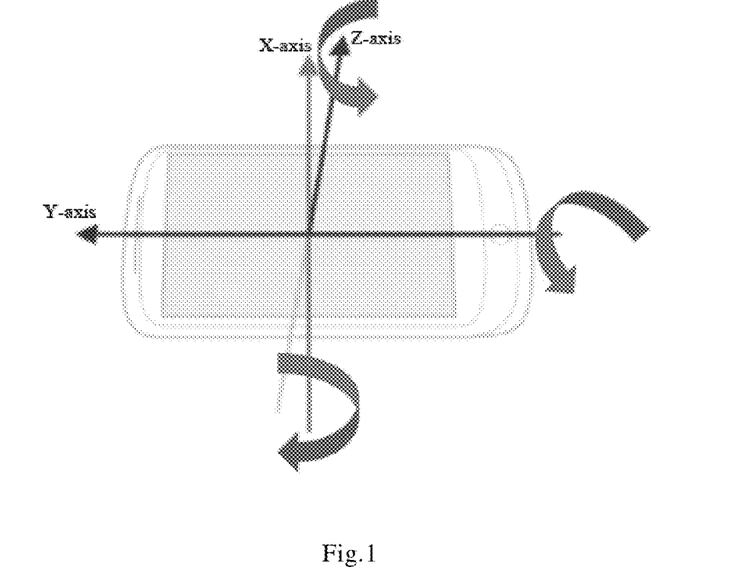
FIG. 1 is a schematic diagram showing a coordinate system used to identify a space where a mobile device is located.
Figure 2:
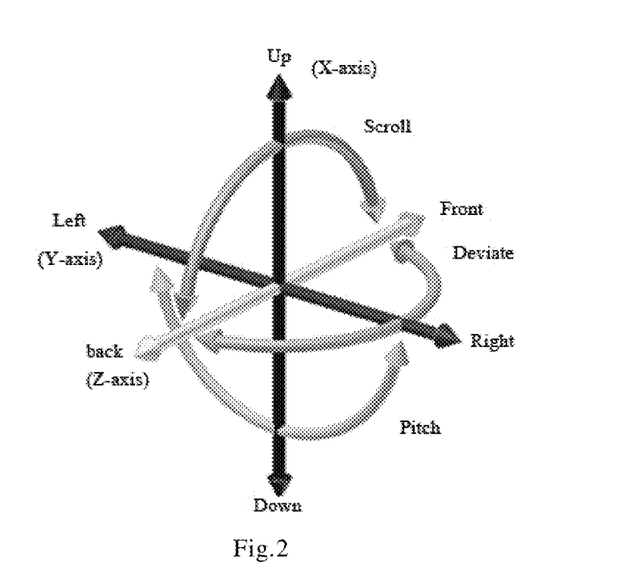
FIG. 2 is a diagram showing a direction parameter correspondence relationship in the coordinate system of the space where a mobile device is located as shown in FIG. 1.

FIG. 1 is a schematic diagram showing a coordinate system of a space where a mobile device is located, and this coordinate system is used to identify directing of a camera of the mobile device; and FIG. 2 is a diagram showing a direction-parameter correspondence relationship in the coordinate system of the space where the mobile device is located as shown in FIG. 1.

In the X-Y-Z axis coordinate system as shown in FIG. 1, when the mobile device is placed horizontally, the X-axis is corresponding to up and down directions, the Y-axis is corresponding to left and right directions, and the Z-axis is corresponding to front and back directions. As shown in FIG. 2, Pitch represents that the mobile device is rotated around the Z-axis at a horizontal position, that is, a change of up and down positions of right and left hands when a user holds the mobile device in hand to photograph; Roll represents an angle rotated around the Y-axis, i.e., a roll angle of the mobile device, i.e., a view extending angle of the camera of the mobile device in the vertical direction; Yaw or Azimuth represents rotating around the X-axis, i.e., a view extending angle of the camera of the mobile device in the horizontal direction. Thus, direction vectors {Pitch, Roll, Yaw} can uniquely determine an attitude angle of the space where the mobile device is located, i.e., a direction pointed by the camera. The vector can be taken as a direction vector used to identify orientation parameters of images photographed by the mobile device.

In the actual photographing process, the user can adjust the directing of the camera within an X-Y two-dimensional plane, and in the process of moving the camera, a sensor equipped inside the mobile device can sense the directing vector of the camera in real time. The direction vectors {Pitch, Roll, Yaw} can be obtained in real time by running the existing related API in the mobile device via a program.

The mobile device herein can be for example a device that supports photographing, such as a smart phone, a tablet computer, a camera and so on. Furthermore, the sensor equipped inside the mobile device and used to sense the directing vector of the camera, for example, may be a directional sensor, or may be formed by combination of a magnetic sensor and an acceleration sensor, or may be other sensors or combination of the sensors being capable of sensing orientations, on which there is no limitation in the present disclosure.

Figure 3:
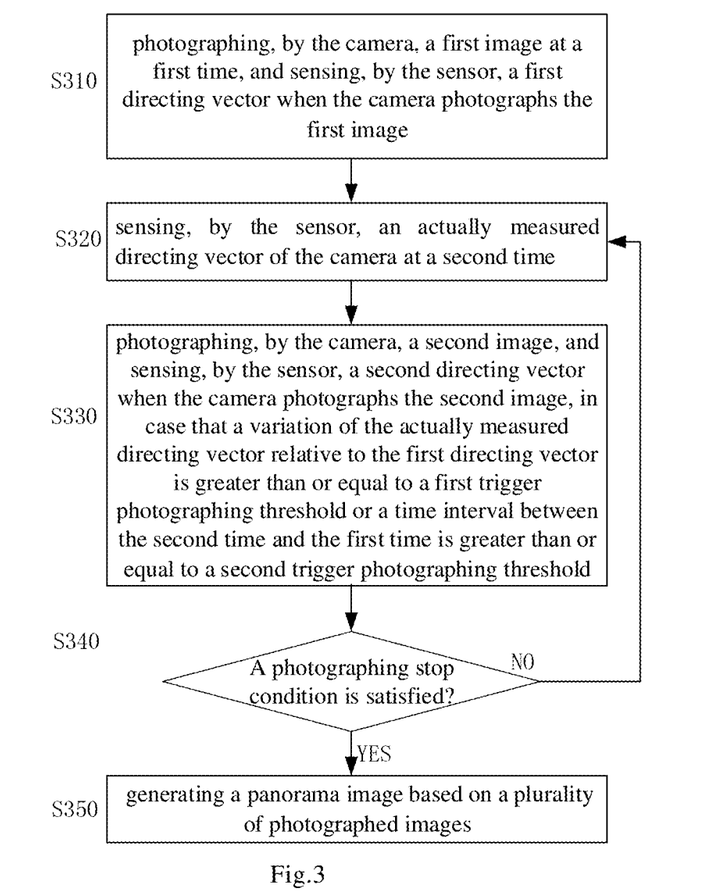
FIG. 3 is a flow diagram showing a method for a mobile device to photograph a panoramic image according to an embodiment of the present disclosure.

FIG. 3 is a flow diagram showing a method for a mobile device to photograph a panorama picture according to an embodiment of the present disclosure.

When the user selects a panorama photographing mode, directs the camera to a photographed object, and presses a photographing button, the process of panorama photographing is started. As shown in FIG. 3, the camera photographs a first image at a first time, and a sensor senses a first directing vector when the camera photographs the first image (S310). The mobile device can store the first image and the first directing vector. After that, the sensor senses an actually measured directing vector at a second time (S320). In the process of adjusting the camera, the actually measured directing vector can be varied dynamically with the directing change of the camera. In case that a variation of the actually measured directing vector relative to the first directing vector is greater than or equal to a first trigger photographing threshold or a time interval between the second time and the first time is greater than or equal to a second trigger photographing threshold, the camera photographs the second image, and the sensor senses a second directing vector when the camera photographs the second image (S330). The mobile device can store the second image and the second directing vector sensed by the camera when the second image is photographed. It is determined whether a photographing stop condition is satisfied (S340). When the photographing stop condition is satisfied, a panoramic image is generated based on the images photographed by the camera (S350). The images photographed by the camera refer to all the images photographed by the camera when the photographing stop condition is satisfied, such as a plurality of the first images and the second images. When the photographing stop condition is not satisfied, it returns to the operation of performing the step S320.

It shall be known that in the case of the photographing stop condition being not satisfied, the above photographing process is performed circularly, and the mobile device photographs a plurality of images automatically and constantly based on the determination of the trigger photographing conditions. That is to say, when a variation of a current angle of the camera relative to an angle upon photographing a previous image is greater than or equal to the first trigger photographing threshold, or when a variation of the current time relative to the time upon photographing the previous image is greater than or equal to the second trigger photographing threshold, the camera of the mobile device would photograph a next image automatically. After that, the sensor of the mobile device can sense the directing change of the camera constantly. When any one of the directing change of the camera or the change of the photographing time interval satisfies the condition again, the camera of the mobile device can photograph one image again. Therefore, the process of photographing circularly can continue until the trigger photographing stop condition is satisfied.

It shall be understood that the first image and the second imager mentioned herein are only used to mark two constantly photographed adjacent images, but are not defined as two initially photographed images. In fact, the first image and the second image described herein may be photographed first image and second image, or may be photographed third image and fourth image, or may be photographed n-th image and (n+1)-th image, where n is an integer greater than or equal to 1.

As an example, a variation of the second directing vector relative to the first directing vector can be an angle change of any component of the vector {Pitch, Roll, Yaw} as shown in FIG. 2. For example, it can be an angle change of a component among the vector {Pitch, Roll, Yaw} which changes fastest.

As an example, the first trigger photographing threshold can be 2°, and the second trigger photographing threshold can be 50 ms. When the change of the pointing direction of the camera is greater than or equal to 2°, or when the time interval of photographing is greater than or equal to 50 ms, a next image is photographed. It shall be known that the first trigger photographing threshold and the second trigger photographing threshold can be fixed, or can be changed into other appropriate values according to the requirement of the user and the actual photographing condition.

As an example, the case satisfying the photographing stop condition can be any of following cases: photographing can be ended when the camera has traversed all areas within a current viewing field (for example, a view finder frame presented on the display screen); or the user ends photographing by manually pressing the photographing stop button, at this time, if there is an area not traversed, then the photographing system automatically analyzes an possible maximum area as an area of final imaging; a predetermined number of images have been photographed; photographing has been performed for a predetermined period of time; interruption of photographing is caused because of running of another application within the mobile device or depending on limitation of storage capability of the photographing system. The above cases are just used as examples of the photographing stop condition, but not used as limitation thereto.

As described above, there is provided in an embodiment of the present disclosure a method for a mobile device to photograph a panoramic image. The method can trigger the camera to photograph images automatically and constantly in case that any one of the directing change of the camera sensed by the sensor equipped inside the mobile device or the photographing time interval satisfies a predetermined condition. Based on this method, when the pointing direction of the camera changes very fast, the directing variation of the camera is taken as a condition for triggering to photograph a next image; when the pointing direction of the camera changes slowly, the time interval for photographing is taken as a condition for triggering to photograph a next image, so that the mobile device can sharply capture a plurality of images being at an appropriate distance. In this way, a distance of photographed images would not be too far or too close, because too far distance would cause that there is no common part between photographed adjacent images such that the images cannot be spliced, while too close distance would cause that there is no much difference between the plurality of photographed images such that photographing resources are wasted. Therefore, it is necessary to photograph at an appropriate distance. Furthermore, since adjustments made by hands of the user on the directing of the camera is irregular, the above problem can be avoided effectively by adopting the double trigger photographing conditions of directing change and time change, so as to generate a desirable panoramic image. Therefore, compared with the method of photographing images by using a single trigger photographing condition such as fixed angle change or fixed time interval, the present method has higher flexibility, and in particular it can adaptively photograph images according to the moving speed of the camera even better.

It shall be known that although the user holds the mobile device in hands to adjust the directing of the camera, the embodiment of the present disclosure is not limited thereto. Further, the mobile device can be displaced on a movable apparatus, and then movement of the camera of the mobile device is controlled by the movable apparatus.

In the actual photographing process, since trembling or shifting easily occur when the user holds the mobile device in hand, it causes that phenomena of distortion and dislocation would occur to a photographed panoramic image, thereby affecting the user's experience. Therefore, according to the method of the embodiment of the present disclosure, a position of a photographed image can be further determined, so as to generate a high-quality panoramic image. This operation will be described below in detail.

In the embodiment of the present disclosure, the method for the mobile device to photograph the panoramic image can further comprise following steps: marking the first directing vector as a direction vector of the first image, and marking a second directing vector as a direction vector of the second image. This can be performed whenever one image is photographed. That is to say, each image would have a direction vector corresponding thereto, and this direction vector is a directing vector of the camera sensed by the sensor when the image is photographed. This step intends to add orientation information to the photographed image, which can be used to determine relative positions of a plurality of photographed images, so as to generate a desirable panoramic image in the subsequent steps.

Figure 4:
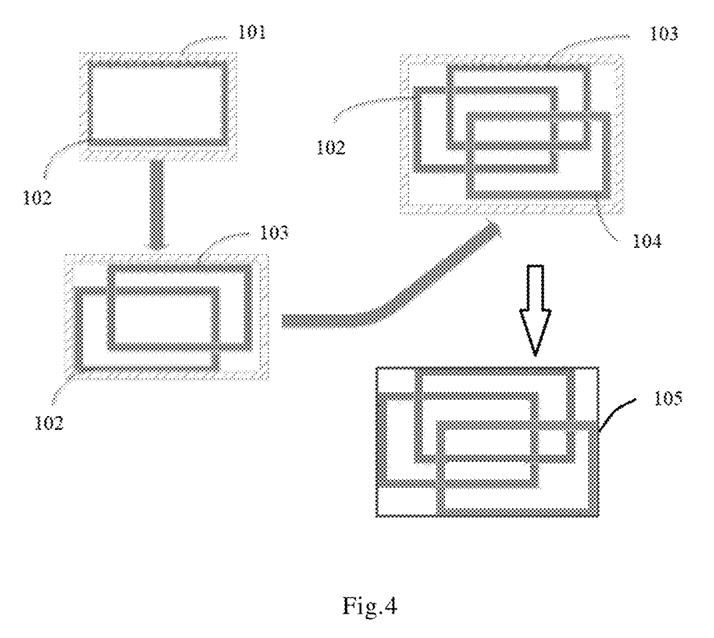
FIG. 4 is a schematic diagram showing displaying respective photographed images on a display screen of a mobile device according to an embodiment of the present disclosure.

FIG. 4 is a schematic diagram of displaying respective photographed images within a viewing mark frame 101 on a display screen according to an embodiment of the present disclosure. In the process of photographing from beginning to end, i.e., in case that the photographing stop condition is not satisfied, the images currently photographed by the camera can be displayed on the display screen of the mobile device in real time, in particular, being displayed within the viewing mark frame 101 on the display screen. The images currently photographed by the camera refer to the images photographed by the camera before the photographing stop condition is satisfied. For example, when the first image 102 is photographed, the first image 102 is displayed in full size within the viewing mark frame 101 on the display screen. As the user constantly adjusts the directing of the camera, as described above, whenever the directing variation of the camera is greater than or equal to a first trigger photographing threshold, or the time interval for photographing is greater than or equal to a second trigger photographing threshold, the mobile device can photograph a next image automatically. Whenever one image is photographed, the mobile device can add a newly photographed image in real time to the viewing mark frame 101 on the display screen for display. In general, the viewing mark frame 101 can be a full-screen valid display area of the display screen. Although FIG. 4 shows three photographed images, such as a second image 103 and a third image 104, the number of the photographed images may be more than three but not limited to three. Moreover, relative positions of the displayed photographed images as shown in FIG. 4 are just for illustration, to which the present disclosure is not limited.

According to the embodiment of the present disclosure, the mobile device can determine relative positions of respective photographed images in the background, and the mobile device can further display the respective photographed images on the display screen according to the determined relative positions.

According to the embodiment of the present disclosure, after the first image and the second image are photographed, the mobile device can determine a pixel shift of the second image relative to the first image, and determine a relative position of the first image and the second image according to the pixel shift of the second image relative to the first image.

When the pixel shift of the second image relative to the first image is determined, one of the following two solutions can be selected depending on a situation. These two solutions will be described below in detail.

In the first case, when the first image and the second image are two initially photographed images, the mobile device can determine an image overlapping area of the first image and the second image, and determine a pixel shift of the second image relative to the first image according to the image overlapping area. For example, as for determination of the image overlapping area, the image overlapping area of the first image and the second image can be detected according an image detection method. For another example, the mobile device can determine the moving direction of the second image relative to the first image according to the direction vector of the first image and the direction vector of the secondi mage, so that an area on the first image which is likely to be overlapped with the second image is selected in this moving direction. This area may be an area having an appropriate size, such as 4*4 pixels, 8*8 pixels, or 16*16 pixels, etc. After an area is selected on the first image, a position of an image as the same as an image within the selected area or a part thereof is quickly detected on the second image, so that the two same images can be overlapped. In this way, the pixel shift of the second image relative to the first image is determined.

In the second case, when the first image and the second image are not two initially photographed images but two randomly adjacent images (for example, a third image and a fourth image) photographed subsequently, the pixel shift between the two images is determined without detecting the overlapping area of the two images, instead, a more simple and convenient method may be considered. Considering that in a same photographing scenario, a certain fixed relationship shall be followed between the pixel shift of the two photographed images and the angle change upon photographing the two images, and then positions of subsequently photographed images can be deduced by utilizing this fixed relationship. In particular, as for the two images photographed in this scenario, a ratio (i.e., $\Delta P/\Delta \Theta$) between a relative pixel shift amount $\Delta P$ in the X-axis (or Y-axis) direction and a direction vector variation $\Delta \Theta$ of the two images should be a constant value.

Therefore, when the relative position of the first image and the second image photographed subsequently, following steps can be performed: the mobile device obtains a reference ratio of the pixel shift and the direction vector variation, and determines the pixel shift of the second image relative to the first image according to the reference ratio and the variation of the direction vector of the second image relative to the direction vector of the first image. Herein, the reference ratio is obtained based on the pixel shift and the direction vector variation between a first image initially photographed by the camera and a second image initially photographed by the camera.

By utilizing the fixed relationship between the pixel shift and the angle variation, a pixel shift of a next photographed image relative to a previous photographed image can be determined quickly, so that most computation time can be saved when the relative position of the adjacent images is determined.

It shall be known that the fixed relationship between the pixel shift and the angle variation is applicable to two random images photographed in the same scenario, regardless of whether the two images are adjacent images or are two initially photographed images.

Since the pixel shift of the two initially photographed images has been already determined in the first case, a more convenient method is to further calculate the direction vector variation of the two initially photographed images, and then a ratio between the pixel shift and the direction vector variation is calculated and it is stored within the mobile device as a reference ratio in this scenario so as to be used in the second case.

After relative positions of respective photographed images have been determined through the above reference ratio, since this method of deducing through a mathematical equation is likely to cause a slight deviation between the determined relative positions of the respective images and the actual relative positions of the respective images, the determined relative positions of the respective images can be corrected, so as to generate a panoramic image more accurately.

The relative positions of the images in the second scenario can be corrected by performing the following steps. For example, the mobile device can determine an edge area of an image overlapping area of every adjacent images; and the relative position of the two adjacent images is corrected according to the edge area. Since the relative positions of respective photographed images have been determined in previous steps, that is to say, the deviation between the currently determined relative positions of respective images and their actual relative positions is very small, the subsequent steps are just to adjust the positions of the images slightly. The mobile device can correct the positions of every two images in sequence. In particular, the mobile device can detect several (for example, 1-2) edge pixel rows of the image overlapping area of every two adjacent images, so that the relative positions of the adjacent two images can be adjusted slightly on a small scale. Since it is just to adjust the relative position of two images slightly, only the edge of the overlapping area of two images is needed to be detected. For example, the edge 1 pixel row of the overlapping area can be detected at the first image, and it would be compared with several edge pixel rows of the overlapping area on the second image. When the edge pixel row of the overlapping area of the first image is matched with the edge pixel row of the overlapping area of the second image, the relative position of the first image and the second image is updated based on a matched edge pixel row.

It shall be known that in the embodiment of the present disclosure, as for determination of the image overlapping area and determination of the edge area of the image overlapping area performed successively, the computational complexity required and the time spent are different, and the computational complexity required and the time spent for the latter determination are less than those for the former determination. Obviously, the latter determination needs to detect only several pixels of the edge of the overlapping area. Therefore, in the embodiment of the present disclosure, compared with the method of determining the overlapping area of every two images in sequence, the method of deducing together with correcting requires less computation and has faster speed, and more importantly, it does not need to give up the determined accuracy of the pixel shift.

When the images having been photographed are displayed in real time within the viewing mark frame on the display screen, as the number of photographed images increases, the respective images whose relative positions have been determined can be scaled in proportion, so as to present the images within the viewing mark frame. For example, as shown in FIG. 4, when a first image is photographed, the first image can be displayed within the viewing mark frame in full size. When the camera moves to photograph a second image, the area displaying the first image is scaled down, so as to reserve a space to display the second image, and the second image is displayed at a corresponding position according to the determined relative position of the first image and the second image. When the camera continuously moves to photograph a third image, display positions and sizes of the first and second images are adjusted according to the relative positions of the second image and the third image, so as to reserve an appropriate space to display the third image at a corresponding position. When a fourth, fifth, . . . , N-th image is photographed continuously, the steps are performed similarly until photographing is ended.

By displaying the respective photographed images within the viewing mark frame on the display screen, a moving track of images having been photographed and an area in the viewing area not being photographed are prompted to the user while presenting the viewing area to the use. And then, the user can adjust the directing of the camera on such a basis, so as to traverse the viewing area as much as possible and photograph a plurality of images with the most complete coverage.

In the embodiment of the present disclosure, said generating a panoramic image can comprise: splicing the plurality of images according to relative positions between the plurality of images; and selecting an image within a maximum valid rectangular area 105 shown in FIG. 4 as the panoramic image. For example, when photographing is ended after the photographing purpose desired by the user is realized, the maximum valid rectangular area being covered with images can be selected and clipped, and the plurality of images within the clipped area are spliced smoothly as a panoramic image, and finally the panoramic image is presented on the display screen.

As described above, in the embodiment of the present disclosure, there is provided the method for the mobile device to photograph the panoramic image. Through this method, the relative positions of the respective images can be determined according to the direction vector added to the photographed images, and the respective images can be displayed at the corresponding position of the display screen according to the determined relative positions, so that a moving track of images having been photographed and an area in the viewing area not photographed are prompted to the user while presenting the viewing area to the user. And then, the user can adjust the directing of the camera on such a basis, so as to traverse the viewing area as much as possible and photograph a plurality of images with the most complete coverage, and based on the determined relative positions of the respective images, images within the maximum valid rectangular area are selected, clipped and spliced smoothly, and finally a panoramic image is displayed on the display screen.

Figure 5:
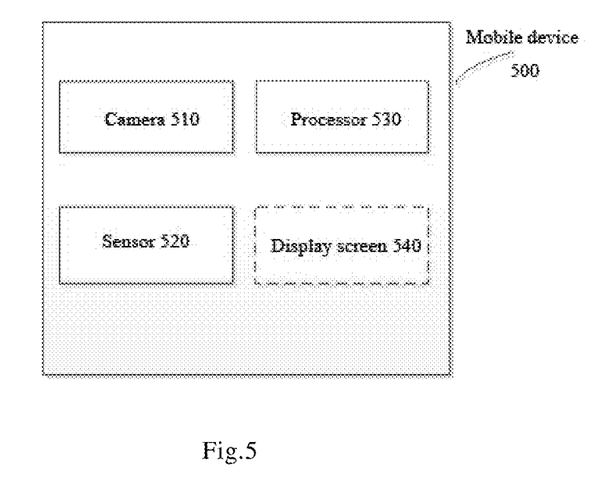
FIG. 5 is a schematic diagram showing a mobile device for photographing a panoramic image according to an embodiment of the present disclosure.

FIG. 5 shows a schematic diagram of a mobile device according to an embodiment of the present disclosure. As shown in FIG. 5, a mobile device 500 can comprise: a camera 510, configured to photograph a first image at a first time; a sensor 520, configured to sense a first directing vector when the camera 510 photographs the first image, and sense an actually measured directing vector of the camera 510 at a second time; a processor 530, configured to: control the camera 510 to photograph a second image and control the sensor 520 to sense a second directing vector when the camera 510 photographs the second image, in case that a variation of the actually measured directing vector relative to the first directing vector is greater than or equal to a first trigger photographing threshold or a time interval between the second time and the first time is greater than or equal to a second trigger photographing threshold, and generate a panoramic image based on a plurality of photographed imaged in case that it is determined that a photographing stop condition is satisfied.

It shall be known that, in the case of the photograph stop condition being not satisfied, the above photographing process is performed circularly, and the mobile device photographs a plurality of images automatically and constantly based on the determination of the trigger photographing condition. That is to say, when a variation of a current angle of the camera relative to an angle upon photographing a previous image is greater than or equal to the first trigger photographing threshold, or when a variation of the current time relative to the time up photographing the previous image is greater than or equal to the second trigger photographing threshold, the camera of the mobile device would photograph a next image. After that, the sensor of the mobile device can sense the directing change of the camera continuously. When any one of the camera directing change and the photographing time interval satisfies the condition again, the camera of the mobile device can photograph one image again. Therefore, the process of photographing circularly can continue until the triggering photographing stop condition is satisfied.

It shall be understood that the first image and the second image mentioned herein are only used to mark two constantly photographed adjacent images, but are not defined as the initially photographed first image and second image. In fact, the first image and the second image described herein may be photographed first image and second image, or may be photographed third image and fourth image, or may be photographed n-th image and (n+1)-th image, where n is an integer greater than or equal to 1.

The mobile device 500 may be a device that supports photographing, such as a smart phone, a tablet computer, and a camera, etc.

In the embodiment of the present disclosure, the sensor 520, for example, may be a directional sensor, or may be formed by combination of a magnetic sensor and an acceleration sensor, or may be other sensors or combination of the sensors being capable of sensing orientations.

The mobile device can further store the first image and the first directing vector, and the second image and the second directing vector sensed by the camera when the second image is photographed.

As an example, the variation of the second directing vector relative to the first directing vector can be an angle variation of any component of the vector {Pitch, Roll, Yaw} as shown in FIG. 2, or it can be an angle variation of the component of the vector {Pitch, Roll, Yaw} which changes fastest.

As an example, the first trigger photographing threshold can be 2°, and the second trigger photographing threshold can be 50 ms. When the variation of the pointing direction of the camera is greater than or equal to 2°, or when the photographing time interval is greater than or equal to 50 ms, a next image is photographed. It shall be known that the first trigger photographing threshold and the second trigger photographing threshold can be fixed, or can be changed into other appropriate values according to the requirement of the user and the actual photographing condition.

As an example, the case satisfying the photographing stop condition can be any of following cases: the user presses the photographing stop button; a predetermined number of images have been photographed; photographing has been performed for a predetermined period of time; interruption of photographing because of running of another application within the mobile device. It shall be known that the above cases are just used as examples of the photographing stop condition, but not used as limitation thereto.

As described above, there is provided in an embodiment of the present disclosure a mobile device for photographing a panoramic image. The mobile device can trigger the camera to photograph images automatically and constantly in case that any one of the camera directing change sensed by the sensor equipped inside the mobile device and the photographing time interval satisfies a predetermined condition. When the pointing direction of the camera changes very fast, the mobile device can take the camera directing variation reaching the first trigger photographing condition as a condition for triggering to photograph a next image; when the pointing direction of the camera changes slowly, the mobile device takes the photographing time interval reaching the second trigger photographing threshold as a condition for triggering to photograph a next image, so that the mobile device can sharply capture a plurality of images at an appropriate distance. In this way, a distance of photographed images would not be too far or too close. Furthermore, since adjustments made by hands of the user on the directing of the camera is irregular, the above problem can be avoided effectively by adopting the double trigger photographing conditions, so as to generate a desired panoramic image.

In the embodiment of the present disclosure, the processor 530 of the mobile device 500 can be further configured to mark the first directing vector as a direction vector of a first image, and mark a second directing vector as a direction vector of a second image. The processor 530 can perform this step whenever one image is photographed. This step intends to add orientation information to the photographed image. The orientation information can be used to for subsequent processing of a plurality of photographed images, for example, determining relative positions of a plurality of photographed images, so as to generate a panoramic image.

In the embodiment of the present disclosure, the mobile device 500 can further comprise: a display screen 540, configured to, in case that the photographing stop condition is not satisfied, display the currently photographed respective images within the display screen 540, in particular, within the viewing mark frame on the display screen 540. For example, when the first image is photographed, the mobile device displays the first image in full size within the viewing mark frame on the display screen 540. As the user constantly adjusts the directing of the camera, as described above, whenever the variation of the camera directing is greater than or equal to a first trigger photographing threshold, or the photographing time interval is greater than or equal to a second trigger photographing threshold, the mobile device can photograph a next image automatically. Whenever one image is photographed, the currently photographed respective images can be displayed in real time within the viewing mark frame of the display screen 540 of the mobile device. In general, the viewing mark frame can be a full-screen valid display area of the display screen 540.

In the embodiment of the present disclosure, the processor 530 of the mobile device can be further configured to determine a pixel shift of the second image relative to the first image, and determine a relative position of the first image and the second image according to the pixel shift of the second image relative to the first image.

According to the embodiment of the present disclosure, the processor 530 can determine relative positions of respective photographed images in the background, and the mobile device 500 can further display the respective photographed images in real time within the viewing mark frame of the display screen 540 according to the determined relative positions of the respective images. As described above, after the first image and the second image are photographed, the processor 530 can determine a pixel shift of the second image relative to the first image, and determine a relative position of the first image and the second image according to the pixel shift of the second image relative to the first image.

When the pixel shift of the second image relative to the first image is determined, one of the following two solutions can be selected depending on a situation. These two solutions will be described below in detail.

In the first case, when the first image and the second image are two initially photographed images, the processor 530 can be configured to: determine an image overlapping area of the first image and the second image, and determine a pixel shift of the second image relative to the first image according to the image overlapping area. For example, as for determination of the image overlapping area, the image overlapping area of the first image and the second image can be detected according to an image detection method. For another example, the mobile device can determine the moving direction of the second image relative to the first image according to the direction vector of the first image and the direction vector of the second image, so that an area on the first image which is likely to be overlapped with the second image is selected in this moving direction. This area may be an area having an appropriate size, such as 4*4 pixels, 8*8 pixels, or 16*16 pixels, etc. After an area is selected on the first image, an area having the same image as the selected area or a part of the selected area on the first image is determined on the second image, so that the two same areas can be overlapped. In this way, the pixel shift of the second image relative to the first image is determined.

In the second case, when the first image and the second image are not initially photographed two images but are two subsequently photographed images (for example, a third image and a fourth image), the processor 530 can be further configured to: obtain a reference ratio of the pixel shift and the direction vector variation, and determine the pixel shift of the second image relative to the first image according to the reference ratio and a variation of the direction vector of the second image relative to the direction vector of the first image. The reference ratio is obtained based on the pixel shift and the direction vector variation between the two initially photographed images among a plurality of images. In particular, the two initially photographed images are selected, and by taking an angle variation $\Delta\Theta$ with a maximum absolute as a reference, a relative pixel shift amount $\Delta P$ of two images in the X-axis and Y-axis directions is further detected. Since a ratio of $\Delta P/\Delta\Theta$ in this scenario is close to a fixed value, it can be used to quickly determine the pixel shift amount of the next photographed image relative to the previous photographed image, so that most computation time can be saved when the relative pixel shift of the adjacent images is determined.

After relative positions of respective photographed images have been determined through the above reference ratio, since this method of deducing is likely to cause a slight pixel deviation to the positions of the respective images, the relative positions of the respective images can be corrected, so as to generate a panoramic image more accurately.

In the embodiment of the present disclosure, the processor 530 can be further configured to: determine an edge area of an image overlapping area of every adjacent images; and correct the relative position of the two adjacent two images according to the edge area. In particular, the processor 530 can detect 1-2 edge pixel rows in the image overlapping area of every two adjacent images, so that the relative positions of the adjacent two images can be adjusted slightly on a small scale.

When the images having been photographed are displayed in real time within the viewing mark frame on the display screen 540, as the number of photographed images increases, the respective images whose relative positions have been determined can be scaled in proportion, so as to display the images within the viewing mark frame on the display screen 540. For example, when a first image is photographed, the first image can be displayed within the viewing mark frame in full size. When the camera moves to photograph a second image, the area displaying the first image is scaled down, so as to reserve a space to display the second image, and the second image is displayed at a corresponding position according to the determined relative position of the first image and the second image. When the camera continuously moves to photograph a third image, display positions and sizes of the first and second images are adjusted according to the relative position of the second image and the third image, so as to reserve an appropriate space to display the third image at a corresponding position. When a fourth, fifth, . . . , N-th image is photographed continuously, the steps are performed similarly until photographing is ended. By displaying the respective photographed images within the viewing mark frame on the display screen, a moving track of images having been photographed and an area in the viewing area not photographed are prompted to the user while presenting the viewing area to the use. And then, the user can adjust the directing of the camera on such a basis, so as to traverse the viewing area as much as possible and photograph a plurality of images with the most complete coverage.

In the embodiment of the present disclosure, the processor 530 can be further configured to: splice the plurality of images according to relative positions among the plurality of images, and select an image within a maximum valid rectangular area as the panoramic image. In particular, when photographing is ended after the photographing purpose desired by the user is realized, the maximum valid rectangular area being covered with images can be selected and clipped by the processor 530, and the plurality of images within the clipped area are spliced smoothly as a panoramic image, and finally the panoramic image is presented on the display screen 540.

As described above, in the embodiment of the present disclosure, there is provided the mobile device for photographing the panoramic image. The mobile device can determine the relative positions of the respective images according to the direction vector added to the photographed images, so that a moving track of images having been photographed and an area in the viewing area not photographed are prompted to the user while the viewing area is presented to the use. And then, the user can adjust the directing of the camera on such a basis, so as to traverse the viewing area as much as possible and photograph a plurality of images with the most complete coverage, and based on the determined relative positions of the respective images, images within the maximum valid rectangular area are selected, clipped and spliced smoothly, and finally a panoramic image is displayed on the display screen.

In the embodiment of the present disclosure, there is further provided a mobile device for performing the method described above. The mobile device can comprise: an image capturing unit, a sensing unit, a controlling unit, and a position determining unit.

In the embodiment of the present disclosure, there is further provided a computer readable storage medium for storing a computer program. The computer program comprises instructions used to perform one or more steps of the method described above.

The embodiment of the present disclosure further provides a computer product, including one or more processors. The processor is configured to execute computer instructions, to preform one or more steps of the method described above.

In one example, the computer product further comprises a storage, connected to the processor and configured to store the computer instructions.

Herein, the storage can be realized by various types of volatile or non-volatile storage device or a combination thereof, such as a static random access memory (SRAM), an electrically erasable programmable read-only memory (EEPROM), an erasable programmable read-only memory (EPROM), a programmable read only memory (PROM), a read-only memory (ROM), and a magnetic memory, a flash memory, a magnetic disk or an optical disk.

Herein, the processor can be a logic operation device having data processing capability and/or program performing capability, such as a central processing unit (CPU) or a field programmable logic array (FPGA) or a microcomputer unit (MCU) or a digital signal processor (DSP) or an application specific integrated circuit (ASIC) or a graphic processing unit (GPU), and so on. One or more processors can be configured to perform the above method simultaneously by a processor set which computes in parallel, or configured to perform a part of steps in the above method by a part of processors, and perform a part of other steps in the above method by a part of processors.

The computer instruction comprises one or more processor operations defined by instruction set architecture. These computer instructions can be included and represented by one or more computer programs logically.

Although exemplary embodiments have been described by referring to the accompanying figures, it shall be understood that the above exemplary embodiments are just for illustration, but do not mean that the scope of the present disclosure is limited thereto. Those ordinary skilled in the art can make various alternations and amendments without departing from the scope and spirit of the present disclosure. All these alternations and amendments intend to be included within the scope of the present disclosure as claimed in the Claims.

What is claimed is:

1. A method for a mobile device to photograph a panoramic image, the mobile device comprising a sensor and a camera, the method comprising:
   photographing, by the camera, a first image at a first time, and sensing, by the sensor, a first directing vector when the camera photographs the first image;
   sensing, by the sensor, an actually measured directing vector of the camera at a second time;
   photographing, by the camera, a second image, and sensing, by the sensor, a second directing vector when the camera photographs the second image, in case that a variation of the actually measured directing vector relative to the first directing vector is greater than or equal to a first trigger photographing threshold or a time interval between the second time and the first time is greater than or equal to a second trigger photographing threshold; and
   determining whether a photographing stop condition is satisfied,
   in case that the photographing stop condition is satisfied, generating a panoramic image based on the images photographed by the camera, and in case that the photographing stop condition is not satisfied, determining whether to photograph, by the camera, a next image at a next time based on a variation of an actually measured directing vector at the next time and a time interval between the second time and the next time, wherein the photographing stop condition includes a condition that photographing has been performed for a predetermined period of time.

2. The method according to claim 1, wherein the mobile device further comprises a display screen; and the method further comprises:
   in case that the photographing stop condition is not satisfied, displaying the images currently photographed by the camera within the display screen; sensing, by the sensor, an actually measured directing vector of the camera at a third time; photographing, by the camera, a third image, and sensing, by the sensor, a third directing vector when the camera photographs the third image, in case that a variation of the actually measured directing vector relative to the second directing vector is greater than or equal to a first trigger photographing threshold or a time interval between the third time and the second time is greater than or equal to a second trigger photographing threshold; and
   in case that the photographing stop condition is satisfied, stopping photographing.

3. The method according to claim 1, further comprising:
   determining a pixel shift of the second image relative to the first image; and
   determining a relative position of the first image and the second image according to the pixel shift of the second image relative to the first image.

4. The method according to claim 3, wherein said determining a pixel shift of the second image relative to the first image comprises:
   determining an image overlapping area of the first image and the second image; and determining the pixel shift of the second image relative to the first image according to the image overlapping area.

5. The method according to claim 3, wherein said determining a pixel shift of the second image relative to the first image comprises:
   obtaining a reference ratio of the pixel shift and a direction vector variation; and determining the pixel shift of the second image relative to the first image according to the reference ratio and a variation of a direction vector of the second image relative to the direction vector of the first image, wherein the direction vector of the first image is same as the first directing vector, and the direction vector of the second image is same as the second directing vector.

6. The method according to claim 5, wherein the reference ratio is obtained based on a pixel shift and a variation of direction vector between a first image initially photographed by the camera and a second image initially photographed by the camera.

7. The method according to claim 5, further comprising:
determining an edge area of the image overlapping area of the first image and the second image; and
correcting a relative position of the first image and the second image according to the edge area.

8. The method according to claim 1, wherein said generating a panoramic image comprises:
splicing the plurality of images according to relative positions among the plurality of images; and
selecting an image within a maximum valid rectangular area as a panoramic image.

9. The method according to claim 8, wherein the maximum valid rectangular area is the maximum rectangular area which is fully covered by the photographed images.

10. A non-transitory computer readable storage medium, used to store a computer program, the computer program comprising instructions used to perform one or more steps in the method according to claim 1.

11. A computer product, comprising one or more processors, the processor being configured to execute computer instructions to perform one or more steps in the method according to claim 1.

12. The method according to claim 1, wherein the photographing stop condition is any one of the following conditions that:
the camera has traversed all areas within a current viewing field;
photographing is ended by manually pressing the photographing stop button;
a predetermined number of images have been photographed;
photographing has been performed for a predetermined period of time;
interruption of photographing is caused because of running of another application within the mobile device or depending on limitation of storage capability of the photographing system.

13. A mobile device, comprising
a camera, configured to photograph a first image at a first time;
a sensor, configured to sense a first directing vector when the camera photographs the first image, and sense an actually measured directing vector of the camera at a second time;
a processor, configured to control the camera to photograph a second image and control the sensor to sense a second directing vector when the camera photographs the second image, in case that a variation of the actually measured directing vector relative to the first directing vector is greater than or equal to a first trigger photographing threshold or a time interval between the second time and the first time is greater than or equal to a second trigger photographing threshold, and determine whether a photographing stop condition is satisfied, in case that the photographing stop condition is satisfied, generate a panoramic image based on the images photographed by the camera, and in case that the photographing stop condition is not satisfied, determine whether to control the camera to photograph a next image at a next time based on a variation of an actually measured directing vector at the next time and a time interval between the second time and the next time, wherein the photographing stop condition includes a condition that photographing has been performed for a predetermined period of time; and
the non-transitory computer readable storage medium according to claim 10, configured to store the images photographed by the camera.

* * * * *